United States Patent [19]
Hirano et al.

[11] Patent Number: 6,137,250
[45] Date of Patent: *Oct. 24, 2000

[54] CONTROLLER FOR ELECTRIC VEHICLE AND ELECTRIC VEHICLE USING THE SAME

[75] Inventors: Hiroyuki Hirano, Kanagawa-ken; Shinichirou Kitada, Tokyo; Toshio Kikuchi, Kanagawa-ken; Eiji Inada, Kanagawa-ken; Ryuichi Idoguchi, Kanagawa-ken; Takeshi Asou, Kanagawa-ken; Yutarou Kaneko, Kanagawa-ken, all of Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/115,635

[22] Filed: Jul. 15, 1998

[30] Foreign Application Priority Data

Jul. 16, 1997 [JP] Japan .................................... 9-191043

[51] Int. Cl.$^7$ ........................................... B60K 6/04
[52] U.S. Cl. ........................... 318/376; 318/139; 318/140; 180/65.2; 180/65.8
[58] Field of Search ..................................... 318/139, 153, 318/140, 375, 376; 364/424.026; 180/65.2, 65.1–65.4, 65.6–65.8; 320/2, 5, 61; 701/202

[56] References Cited

U.S. PATENT DOCUMENTS

| | | | |
|---|---|---|---|
| 5,532,929 | 7/1996 | Hattori et al. | 364/431.07 |
| 5,550,445 | 8/1996 | Nii | 318/153 |
| 5,650,931 | 7/1997 | Nii | 364/424.026 |
| 5,785,137 | 7/1998 | Reuyl | 180/65.2 |
| 5,909,094 | 6/1999 | Yamada et al. | 318/140 |
| 5,984,034 | 11/1999 | Morisawa et al. | 180/65.2 |

FOREIGN PATENT DOCUMENTS 6-245324  9/1994  Japan .

*Primary Examiner*—Paul Ip
*Assistant Examiner*—Rita Leykin
*Attorney, Agent, or Firm*—Foley & Lardner

[57] ABSTRACT

There is disclosed a controller for an electric vehicle that allows for securing a sufficient battery capacity and is able to substantially avoid giving an uncomfortable feeling to the crew even if an engine for power generation is started. The controller comprises a power generation control unit which makes a generator of the electric vehicle generate electric power by starting a generator-driving engine of the electric vehicle in the case that an SOC (state of charge) of a battery of the electric vehicle is equal to or less than a first value, and further makes the generator generate the electric power by starting the generator-driving engine in the case that the SOC of the battery is equal to or less than a second value larger than the first value and a predetermined condition is satisfied. Further, an electric vehicle provided with such a controller is also disclosed.

28 Claims, 11 Drawing Sheets

CONTROLLER FOR ELECTRIC VEHICLE AND ELECTRIC VEHICLE USING THE SAME

The contents of Application No. TOKUGANHEI 9-191043, with a filing date of Jul. 16, 1997 in Japan, are hereby incorporated by reference.

BACKGROUND OF THE INVENTION

1. Field of the Invention

The present invention relates to a controller for an electric vehicle and an electric vehicle using the same, and more particularly, relates to a control technology for a generator-driving engine in a series hybrid electric vehicle, where electric power to be supplied to a battery which supplies its electric power to a vehicle-driving electric motor is supplied by a generator driven by utilizing a generator-driving engine (for example, a generator-driving internal combustion engine).

2. Description of the Related Art

There has so far been an electric vehicle called a series hybrid electric vehicle (SHEV) as the electric vehicle provided with a generator and a generator-driving engine.

Such a SHEV has been developed with a view to securing a longer driving distance of an electric vehicle (EV) by utilizing electric power generated by a generator.

More specifically, there has been a conventional method for controlling a generator in the following manner.

When the battery is in a status of being sufficiently charged with electric power, the electric vehicle is driven by use of only energy supplied by the battery, and when the battery comes to a status of being not sufficiently charged with electric power, a generator-driving engine is started and a power generation by the generator is started.

Then, energy obtained by this power generation is used for charging the battery and/or as energy for operating a driving motor. When the battery reaches a sufficiently charged status, the generator-driving engine is stopped and the power generation by the generator is finished.

Generally a charging status of the battery is evaluated by using a "state of charge (SOC)". More specifically, if the SOC is at or above a preset value, it is evaluated that the battery is in a sufficiently charged status and if the SOC is less than the preset value, it is evaluated that the battery is not in a sufficiently charged status.

For further details, a method for detecting the SOC by measuring a battery voltage under the condition that an accelerator position is at or below a predetermined value in order to accurately detect the SOC is disclosed in Japanese Patent Application Laid-open Publication No. 6-245324.

According to the conventional method, however, there has been such a case, for example, where a generator-driving engine is started when a vehicle is in a stopped status, because its generator starting timing or its timing for starting the generator-driving engine is determined based on only the SOC.

In such a case, there is a possibility that vibration and noise are generated by a cranking of the engine and the vibration and noise give uncomfortable feeling to the crew such as a driver and/or a passenger, that is, particularly decrease the feeling of quiet and smooth driving which is the characteristic of the electric vehicle.

SUMMARY OF THE INVENTION

It therefore is an object of the present invention to provide a controller which can charge a battery in a satisfactory condition and can effectively restrict occurrence of a phenomenon that noise and vibration generated by a cranking due to a starting of a generator-driving engine give an uncomfortable feeling to a crew including a driver and/or a passenger so as to be preferably used for an electric vehicle, and to provide an electric vehicle using such a controller.

The present invention provides a controller which can be preferably used for an electric vehicle and comprises a power generation control unit or power generation control means. Here, the electric vehicle is provided with an electric motor, a battery storing electric power, a generator generating electric power so as to supply the electric power generated by the generator to the electric motor and/or the battery, and an engine capable of making the generator generate the electric power, and the electric vehicle is driven by utilizing the electric motor. And the power generation control unit or power generation control means makes the generator of the electric vehicle generate the electric power by starting the engine in the case that an SOC of the battery is equal to or less than a first value, and further makes the generator generate the electric power by starting the engine in the case that the SOC of the battery is equal to or less than a second value larger than the first value and when a predetermined condition is satisfied.

Further, the present invention provides an electric vehicle which comprises an electric motor driving the electric vehicle, a battery storing electric power to be supplied to the electric motor, a generator generating electric power so as to supply the electric power generated by the generator to the electric motor and/or the battery, an engine making the generator generate the electric power, and a controller making the generator generate the electric power by starting the engine in the case that an SOC of the battery is equal to or less than a first value, and further making the generator generate the electric power by starting the engine in the case that the SOC of the battery is equal to or less than a second value larger than the first value and a predetermined condition is satisfied.

According to the above controller for an electric vehicle and the electric vehicle, it is possible to start the engine in order to make a power generation in the case that a predetermined condition to be explained later in detail is satisfied even if the SOC of the battery is larger than the value of the SOC at which a power generation is normally started.

In other words, the present invention is based on a technical idea that, by increasing the opportunity of starting the power generation, it becomes possible to generate electric power in a state such that vibration and noise generated by the starting of the engine do not give an uncomfortable feeling to the crew in the vehicle even if the engine is started.

Accordingly, it is possible to make the power generation started by starting the engine in such a situation when vibration and noise of the electric motor are being generated to a relatively large degree, or when a mounting system of the engine has been displaced to a relatively large degree by a driving reaction force, or when vibration and noise are being generated to a relatively large degree by the driving of the electric vehicle, or when the electric vehicle is being driven in an intentionally accelerated state by the driver, etc. By this structure, it becomes possible to substantially prevent the crew from feeling the vibration and noise generated by the cranking of the engine and to substantially avoid giving an uncomfortable feeling to the crew due to the starting of the engine.

Further, as the opportunity of power generation increases, occasions of the battery capacity shortage can be reduced effectively, thus achieving a highly reliable driving performance by an electric driving force.

It is preferable that the above-mentioned predetermined conditions are specifically as follows; a condition that an accelerator pedal stroke volume of the electric vehicle is at or above a predetermined value, a condition that an accelerator pedal stroke velocity of the electric vehicle is at or above a predetermined value, a condition that a velocity of the electric vehicle is at or above a predetermined value, or an acceleration of the electric vehicle is at or above a predetermined value.

This is because that these conditions correspond respectively to the case where vibration and noise of the electric motor may be generated to a relatively large degree, the case where the mounting system of the engine may be displaced to a relatively large degree by a driving reaction force, the case where vibration and noise may be generated to a relatively large degree by the driving of the electric vehicle, and the case where the electric vehicle is being driven according to the driver's intention, as described above. That is, under these conditions, the uncomfortable feeling is not given to the crew by the starting of the engine.

In other words, it can be said that these predetermined conditions practically correspond to a condition that the electric vehicle is highly loaded.

Also, in other words, these predetermined conditions practically correspond to a condition that the vibration and/or noise due to the starting of the engine that can be sensed by the crew in the electric vehicle is smaller than a total vibration and/or noise of the electric vehicle that can be sensed by the crew during a period from before the starting of the engine to after the stopping of the engine. That is, these predetermined conditions mean that the crew in the electric vehicle can feel the vibration and/or noise due to the starting of the engine substantially continuously.

It is preferable from the viewpoint of securing a sufficiently large battery capacity that the above described predetermined condition is the condition that an opportunity of starting the engine increases when the SOC of the battery approaches the first value.

Further, it is preferable from the viewpoint of securing a sufficiently large battery capacity and also eliminating an unnecessary starting of the engine that the second value of the SOC of the battery is located within a range of above a so-called normal power generation starting SOC and below a so-called normal power generation completion SOC by a predetermined value, as in this range, it is possible to set the battery not to generate electric power when the need for a power generation is small.

A controller of the present invention can be applied to a SHEV, and the SHEV applied with this controller can exhibit a highly reliable driving performance by securing a sufficiently necessary battery capacity and can substantially avoid giving the uncomfortable feeling to the crew by the starting of the engine at the time of a power generation.

DETAILED DESCRIPTION OF THE PREFERRED EMBODIMENTS

There will be detailed below the preferred embodiments of the present invention with reference to the accompanying drawings.

Figure 1:
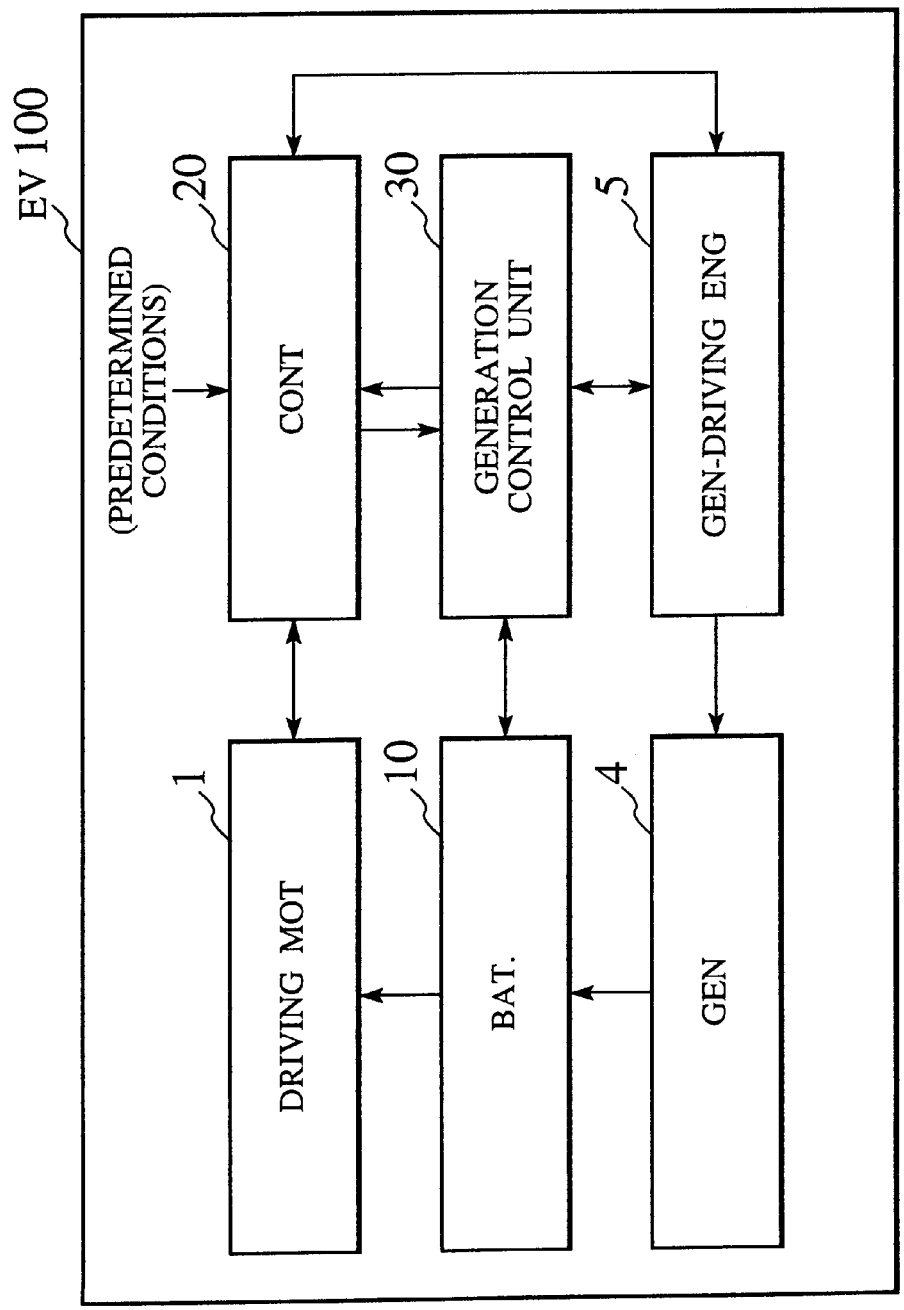
FIG. 1 is a block diagram for showing a schematic structure of a controller for an electric vehicle according to a first embodiment of the present invention.

FIG. 1 is a diagram for showing a schematic configuration of a controller for an electric vehicle according to a first embodiment of the present invention.

An electric vehicle EV 100 in FIG. 1 is provided with a driving electric motor 1 as shown DRIVING MOT, and the driving motor 1 is connected with a power supply battery 10 as shown BAT. The battery 10 is connected with a generator 4 as shown GEN, and the generator 4 is driven by a generator-driving engine 5 as shown GEN-DRIVING ENG to generate electric power. Electric power generated by the generator 4 is supplied to the battery 10. And the electric power can be supplied to the driving motor 1 if necessary.

The EV 100 is provided with a controller 20 for mainly controlling the driving motor 1 and the engine 5. The EV 100 is further provided with a power generation control unit (a power generation control means) 30 for making the generator 4 generate electric power by starting the engine 5 under a predetermined condition to be described later in detail even if an SOC of the battery 10 is larger than an SOC at which normally a power generation for charging is started.

In FIG. 1, the control unit 30 is shown to be provided at the outside of the controller 20. However, instead of this arrangement, there may be provided a power generation control unit (a power generation control means) for generating electric power by use of the generator 4 by starting the engine under a predetermined condition, so as to be included inside a controller having a function for mainly controlling the driving motor 1 and the engine 5.

Of course, the above controller and the control unit (control means) may also be structured by independent devices corresponding to each function or may be structured by one device having suitably combined functions.

Figure 2:
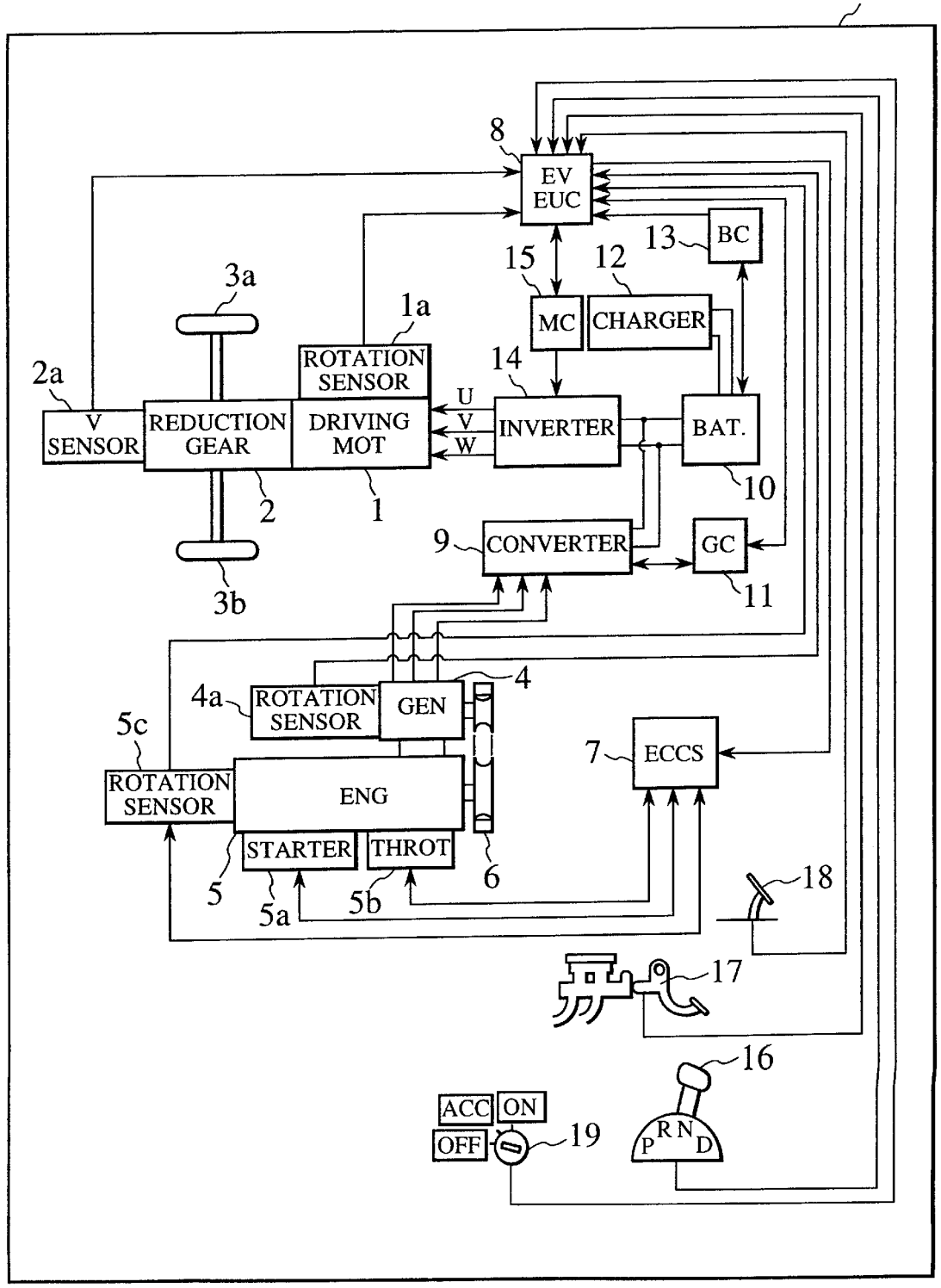
FIG. 2 is a configuration diagram for showing a further detailed structure of the controller.

FIG. 2 shows a system configuration of the EV 100 of the present embodiment.

In FIG. 2, the driving motor 1 is connected to a reduction gear system 2 and a differential gear system not shown provided in the reduction gear system 2, through an output shaft not shown, and is finally connected to left and right wheels 3a and 3b through the reduction gear system 2 and the differential gear system, so as to transmit a driving force.

The driving motor 1 is provided with a rotation sensor 1a, and the rotation sensor 1a detects number of revolutions (speed of revolution) of a rotor of the driving motor 1 and transmits this information to an EV controller (EV ECU) 8 and a speedometer which is not shown.

The generator 4 is driven by the engine 5 through an auxiliary machine-driving belt 6 such as a V belt or the like, and generates an AC power. The AC power thus generated is converted into a DC power by a converter 9 and the DC power is supplied to the battery 10 to charge the battery 10. Depending on the situation, the power may be supplied either directly to only the driving motor 1 or to the driving motor 1 while being supplied to the battery 10.

The EV ECU 8 sends an instruction for monitoring and controlling the power generation volume (voltage and current) generated by the generator 4 to a generator controller (GC) 11. The power generation volume is monitored and controlled by the GC 11.

As the battery 10 has a characteristic that a chargeable volume of electric power changes depending on the temperature, etc., the EV ECU 8 determines the volume of electric power to be generated by the generator 4 corresponding to a chargeable range while monitoring an SOC and a temperature of the battery 10 by using a battery controller (BC) 13, and sends a charge starting instruction and a charge stopping instruction to the GC 11.

Of course, a necessary volume of power generation also changes depending on whether the electric vehicle is in the state of being driven by the driving motor 1 or not, that is, depending on the SOC status of the battery 10. The EV ECU 8 determines the volume of power to be generated by the generator 4 corresponding to a value of the SOC in such a way that the power generation volume becomes relatively larger when the value of the SOC is small in such a case that the electric vehicle is being driven by the driving motor 1, and on the other hand the power generation volume becomes relatively smaller when the value of the SOC is large in such a case that the electric vehicle in a halted status or in the status that the electric vehicle is not being driven by the driving motor 1. The EV ECU 8 then sends the charge starting instruction and the charge stopping instruction to the GC 11.

The generator 4 is provided with a rotation sensor 4a. The rotation sensor 4a detects the number of revolutions (speed of revolution) of the generator 4 and transmits this information to the EV ECU 8.

And the engine 5 is controlled by an engine controller (ECCS) 7, and various signals for instructing the operation, stopping and controlling number of revolutions (speed of revolution) of the engine 5 are sent to the ECCS 7 from the EV ECU 8.

That is, the engine 5 is controlled by the ECCS 7, started by a starter motor 5a, and the number of revolutions (speed of revolution) of the engine 5 is controlled by a throttle valve 5b. Further, the engine 5 is provided with a rotation sensor 5c, and the rotation sensor 5c detects the number of revolutions (speed of revolution) of the engine and transmits the detected information to the EV ECU 8 and the speedometer which is not shown, through the ECCS 7.

A DC power supplied by the battery 10 is changed into an AC power by an inverter 14, and this AC power is supplied to the driving motor 1. Regarding the inverter 14, the output and the number of revolutions (speed of revolution) of the driving motor 1 are monitored and managed by a motor controller (MC) 15 through a voltage, a current and a frequency supplied to the driving motor 1 by the inverter 14. The EV ECU 8 calculates the output and the number of revolutions (speed of revolution) to be supplied to the driving motor 1 based on the information of a stroke of an accelerator pedal 18 depend on treading by the driver of the EV 100 and positional information of a starting key 19, and a result of the calculation is sent to the MC 15. Based on this information, the MC 15 performs the monitoring and management.

The battery 10 can also be charged with electric power from a charging stand or a house-service power supply through a charger 12 provided inside the EV 100. The charger 12 may of course be provided outside the EV 100 so as to supply electric power by connecting the charger 12 to a strong current line inside the EV 100.

Figure 3:
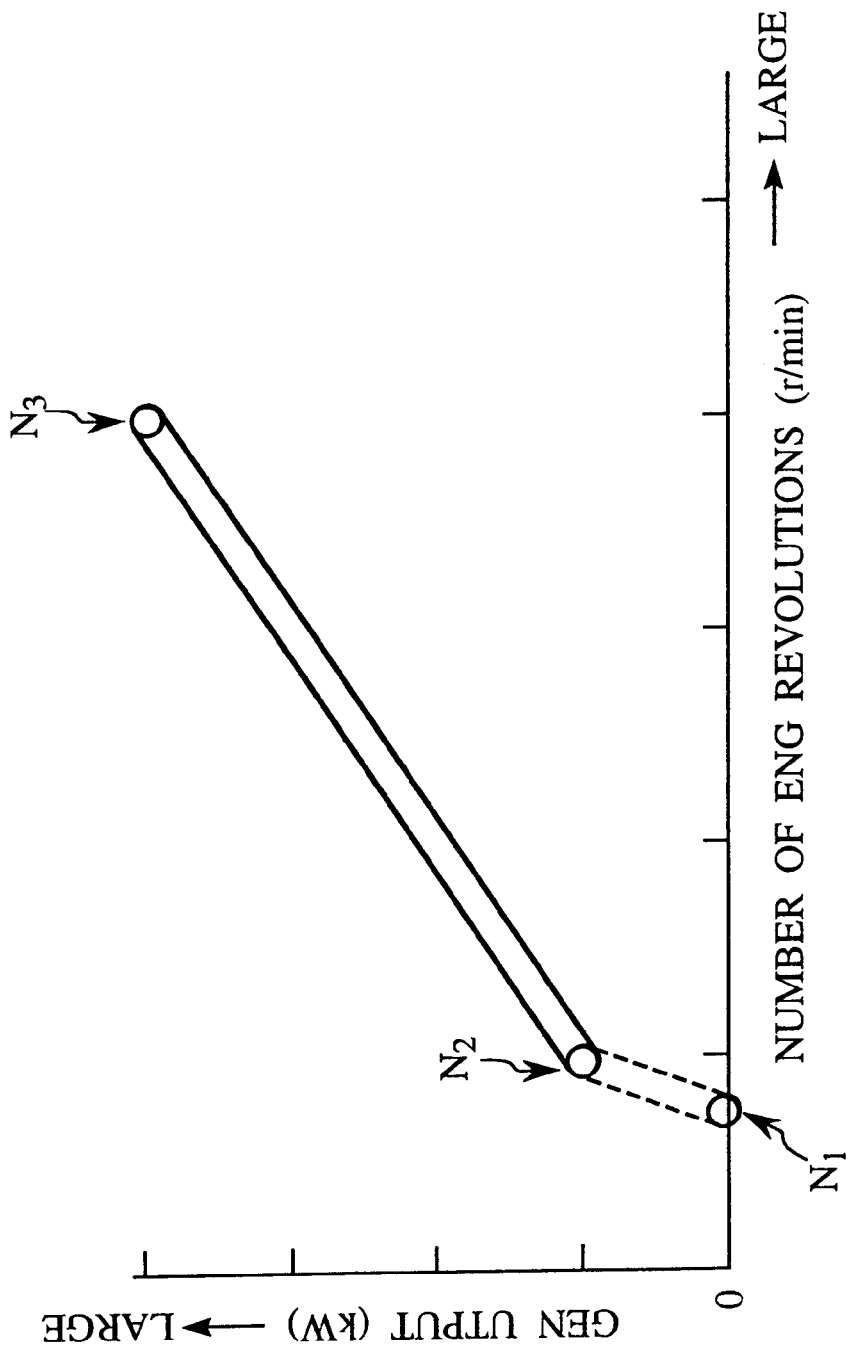
FIG. 3 is an output characteristic diagram of a generator controlled by the controller.

FIG. 3 shows one example of output characteristics of the generator 4 according to the present embodiment.

The horizontal axis of FIG. 3 corresponds to number of the revolutions (speed of revolution) of the engine and the vertical axis corresponds to a power generation output of the generator 4.

It can be known from FIG. 3 that after the engine 5 is started, the generator 4 performs an idling operation at an engine rotation number N1 (for example, 800 r/min) and can generate electric power at a generation output proportional to the engine revolution number within a range of not lower than a rotation number N2 (for example, 1000 r/min) and not higher than N3 (for example, 4000 r/min).

Figure 4:
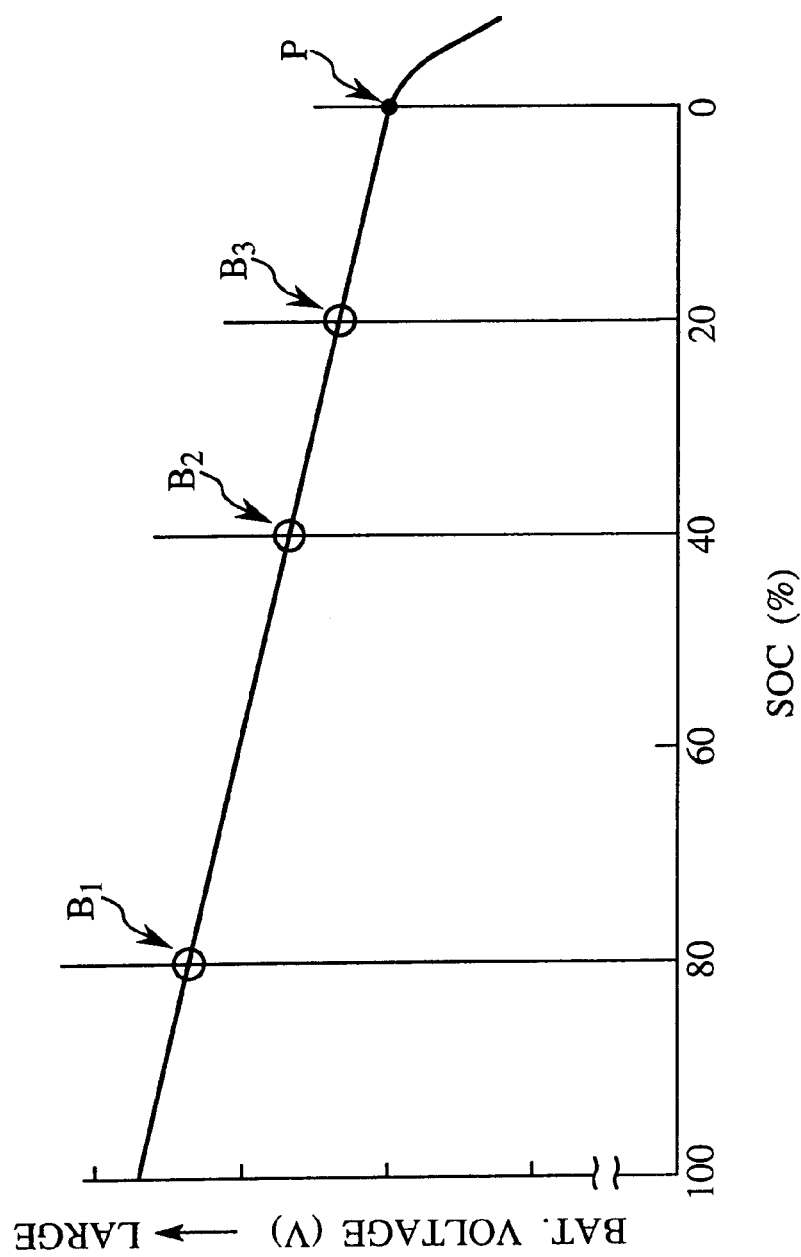
FIG. 4 is a characteristic diagram of a battery controlled by the controller.

FIG. 4 shows one example of charge electric characteristics of the battery 10 according to the present embodiment.

The horizontal axis of FIG. 4 corresponds to an SOC (%) and the vertical axis corresponds to a battery voltage (V).

From FIG. 4, it can be known that along with a reduction of the SOC, the battery voltage also decreases gradually and the battery voltage drops suddenly after a certain point.

In the present embodiment, it is so set that the SOC is 0 (%) at a point P where the battery voltage drops suddenly.

Further, a charge (power generation) completion point B1 is set at a point of SOC 80 (%) by considering room for a regenerative charging of the driving motor 1, etc. A point corresponding to SOC 100 (%) is a point of a so-called normal power generation completion point and corresponds to a "normal power generation completion SOC".

Further, a charge (power generation) starting point B3 is set at a point of SOC 20 (%) by considering a fact that when the output (power consumption) of the driving motor 1 is larger than the capacity of power generation, the deficit is compensated from the battery 10. The point B3 is a so-called normal power generation starting point and corresponds to a "normal power generation starting SOC".

The point B2 in FIG. 4 corresponds to a point at which charging (power generation) is started in the range between B1 and B2 when a condition regarding an accelerator position and a vehicle velocity, etc. to be described later are satisfied, and B2 is set at a point of SOC 40 (%) in the present embodiment. At B2, charging (power generation) can be started with room (margin) as compared with a point of B3 as described later and an opportunity for charging (power generation) can be increased.

Figure 5:
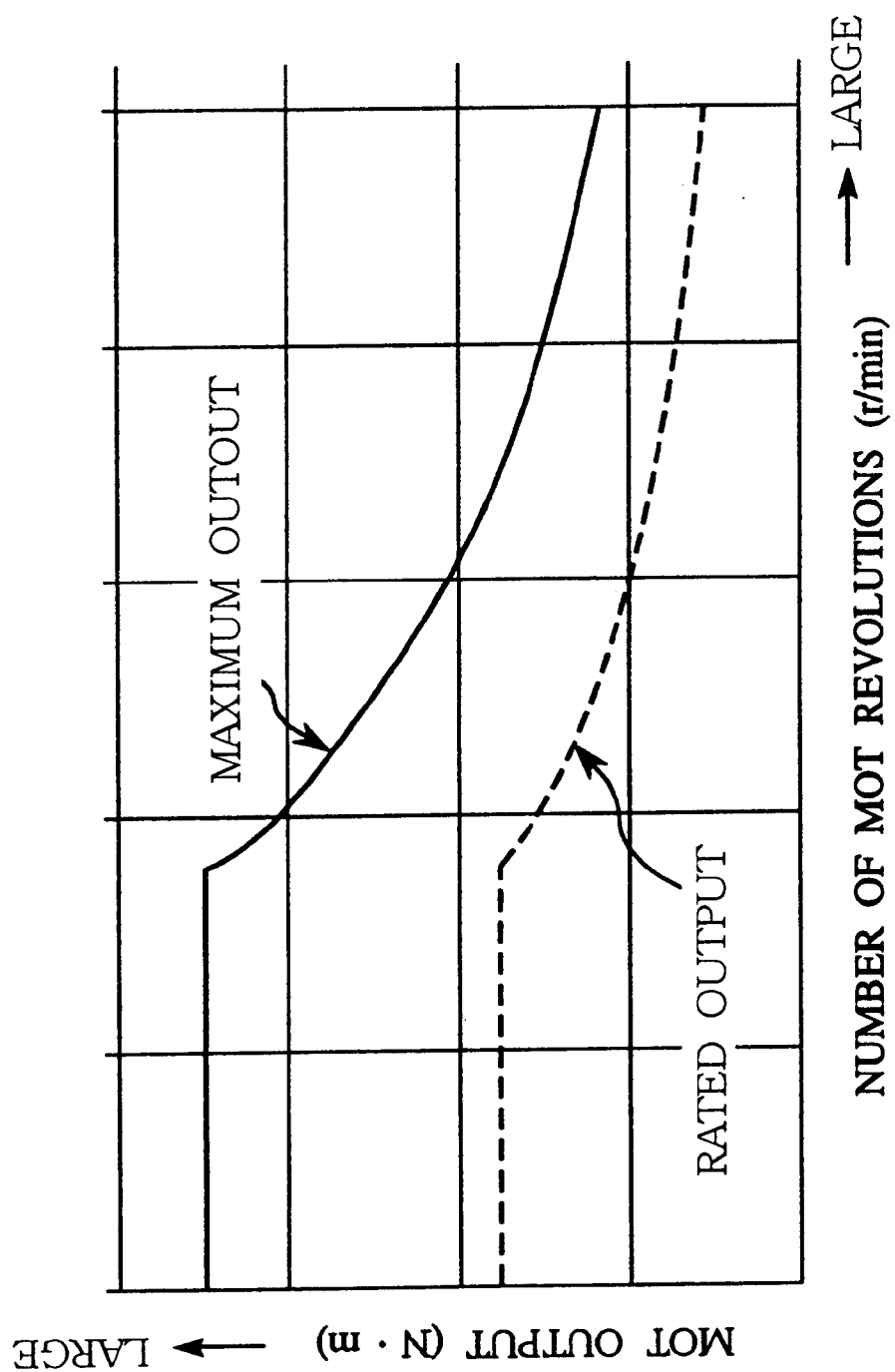
FIG. 5 is an output characteristic diagram of a driving electric motor controlled by the controller.

FIG. 5 shows one example of output characteristics of the driving motor 1 in the present embodiment.

The horizontal axis of FIG. 5 corresponds to a motor revolution number (speed of revolution) (r/min) and the vertical axis corresponds to a motor output (N·m).

In FIG. 5, a solid line represents a maximum output line diagram and a broken line represents a rated output line diagram. Generally a maximum output is set at about two times the rated output.

Figure 6:
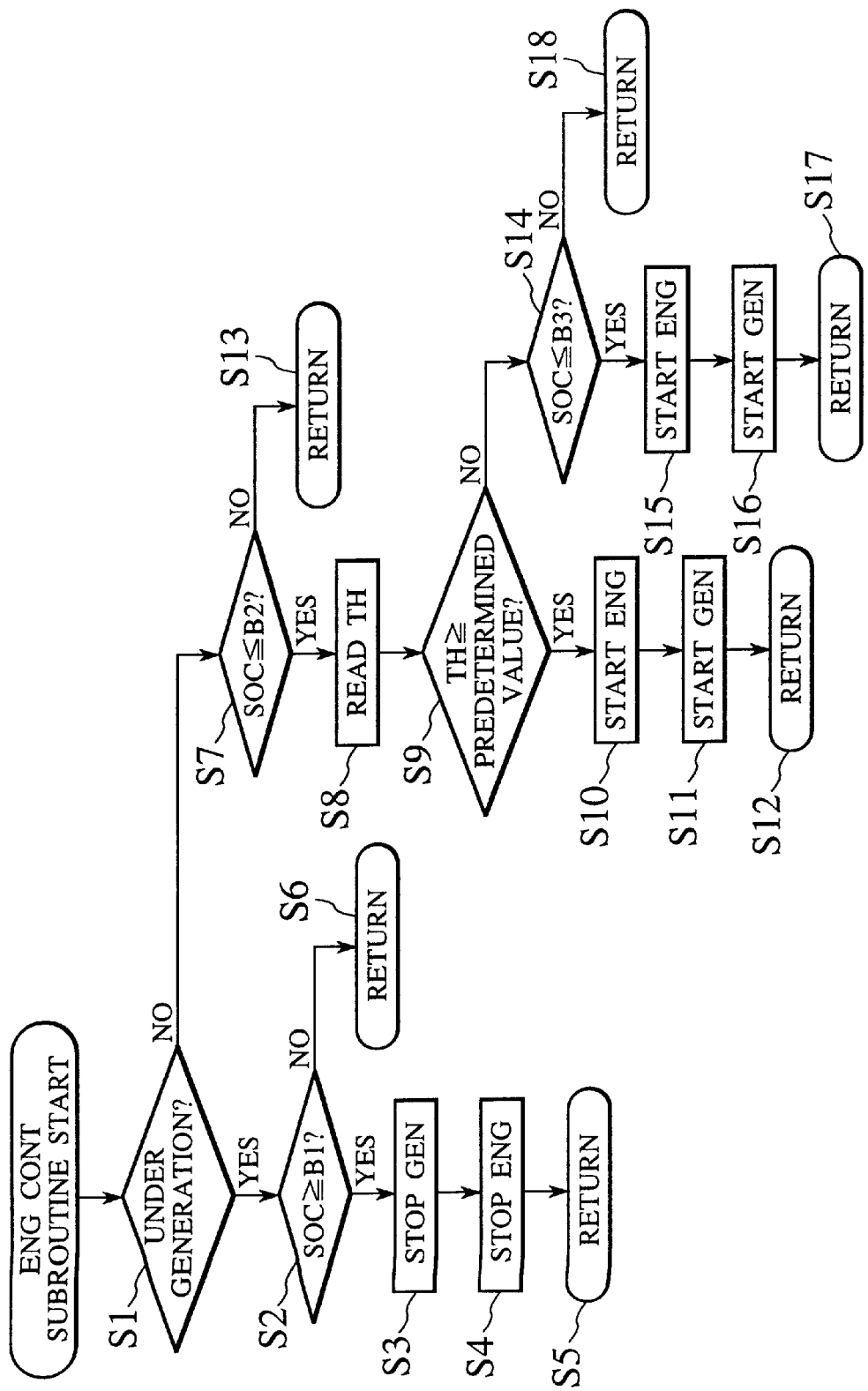
FIG. 6 is a diagram for showing a flowchart of the control by the controller.

FIG. 6 shows a flowchart of the control to be performed in cooperation by the ECCS 7, the EV ECU 8, the GC 11 and the BC 13 for practically structuring the controller in the present embodiment, particularly the control focused on the power generation control (engine control).

Referring to FIG. 6, when the control is started, a decision is made at S1 as to whether a power generation is being carried out at present or not. This decision is made by the EV ECU 8 from the viewpoint of whether a power generation instruction has been sent to the converter 9 from the GC 11 that received a charge starting instruction from the EV ECU 8 or whether the converter 9 itself is in operation. If the power generation is in progress, the process goes to S2, and if power generation is not being carried out, the process goes to S7.

At S2, the BC 13 makes a decision as to whether the SOC of the battery 10 is at or above the charge (power generation) completion point B1 of FIG. 4 or not. If the SOC of the battery 10 is at or above B1, a decision is made that the charge has been completed, and the process goes to S3. On the other hand, if the SOC of the battery 10 is less than B1, the process goes to S6 and is then returned to S1 and the above flow is repeated until when the SOC of the battery 10 becomes B1 or above.

Next, at S3, as the BC13 has made a decision that a charging to the battery 10 has been completed, the EV ECU 8 sends a charge stopping instruction to the GC 11 to stop the operation of the converter 9 though the GC 11. At S4, then, the EV ECU 8 sends an engine stopping instruction to the ECCS 7 to stop the engine 5 through the ECCS 7, and after completing the charging, the process returns to S1.

On the other hand, at S1, when a decision has been made that the power generation is not being carried out, the process goes to S7. At S7, the BC 13 makes a decision as to whether the SOC of the battery 10 is not higher than a predetermined value B2 in FIG. 4 or not. If the SOC of the battery 10 is at or below B2, a decision is made that a charging is being awaited, and the process goes to S8. If the SOC of the battery 10 is larger than B2, the process goes to S13 and returns to S1.

At S8, the EV ECU 8 reads an accelerator stroke volume (an accelerator pedal treading volume) TH and the process proceeds to S9. At S9, the EV ECU 8 makes a decision as to whether or not the accelerator stroke volume TH is at a predetermined value or above (for example, the accelerator stroke volume is 3/4 or above, provided that its full stroke volume corresponds to 4/4). If the accelerator stroke volume is at or above the predetermined value, a decision is made that the vehicle velocity is high or the vehicle is under acceleration, and the process goes to S10. If the accelerator stroke volume is less than the predetermined value, the process goes to S14.

Next, at S10, the engine 5 is started through the ECCS 7 which received an engine starting instruction from the EV ECU 8, and at S11, the power generation is started through the GC 11 which received the instruction from the EV ECU 8. At S12, then the process returns to S1.

On the other hand, at S14, the BC 13 makes a decision as to whether or not the SOC of the battery 10 is at or below the charge (power generation) starting point B3 in FIG. 4.

If the SOC of the battery 10 is at or below B3, the BC 13 makes a decision that there is a high urgency of the need for charging, and at the following step S15, makes the engine 5 started through the ECCS 7 that received an engine starting instruction from the EV ECU 8. At S16, then power generation is started through the GC 11 that received an instruction from the EV ECU 8, and the process returns at S17.

On the other hand, if the SOC of the battery 10 is larger than B3, that is, if a decision has been made that the SOC of the battery 10 is positioned between B2 and B3, the process goes to S18 and returns to S1. In such a case, a flow from s1 is repeated until when a decision is made at S9 that the accelerator stroke volume TH is at or above the predetermined value or until when a decision is made at S13 that the accelerator stroke volume TH is at or below B3.

As explained above, according to the present embodiment, there is provided a structure for starting a power generation by starting the engine 5 if the condition is met that the accelerator stroke volume (accelerator pedal treading volume) TH is at or above a predetermined position even if the SOC of the battery 10 is in a region of being larger than B3 and smaller than B2, not only in the case where the SOC of the battery 10 is at or below B3 which is the normal power generation starting condition.

In the above described structure, as the opportunity for starting a power generation increases, there arises a smaller frequency that the SOC of the battery 10 is at or below B3 as the normal power generation starting condition.

As a result, it becomes possible to decrease the opportunity for performing power generation by starting the engine 5 when the electric vehicle is in a stopped status, thus making it possible to effectively restrict vibration and noise of the engine 5.

Further, in the present embodiment, the engine 5 is started by meeting the condition that the accelerator stroke volume (accelerator pedal treading volume) TH is at or above the predetermined value in the case where the SOC of the battery 10 in the region of being larger than B3 and smaller than B2. The fact that the TH is at or above the predetermined value means that the electric vehicle is under a highly loaded condition such as the electric vehicle is driving at a high velocity, or is driving in acceleration or is going up a slope, or the like. In other words, the electric vehicle is placed under the condition that vibration and noise are being generated by the driving of the driving motor 1 and a certain level of vibration and noise are being generated by the road noise by the driving of the electric vehicle and by its wind breaking. Even if the engine 5 is started under the above situation, the crew in the vehicle does not feel strongly the above vibration and noise as they are hidden by the background vibration and noise, substantially. In other words, the crew does not practically feel the fact that the noise and vibration has increased.

Accordingly, it becomes possible to restrict relatively the vibration and noise of the engine 5 when it is started.

Further, under the above described highly loaded condition, the reaction force of the driving torque of the driving motor 1 is transmitted to the engine mounting system of the engine 5 and the displacement of the engine mounting system is increased.

For example, if the starting torque of the engine 5 is 49 N·m and the ring gear radius is 0.13 m, the exciting force is 372 N. On the other hand, if the accelerator stroke volume (accelerator pedal treading volume) is at or above a predetermined value, the driving reaction force is 9800 N, when the driving torque of the driving motor 1 is 98 N·m, the total gear ratio is 10 and the final gear radius is 0.1 m.

In other words, no significant changes occur in the interruption characteristics of the vibration of the engine mounting even if the force of 372 N at the starting time of the engine 5 is further added to the highly loaded engine mounting which has already been displaced by being applied with the force of 9800 N.

Accordingly, the starting of the engine 5 in this status does not generate significant vibration or noise.

Next, a second embodiment of the present invention will be explained in detail with reference to the drawings.

The system configuration itself of the present embodiment is similar to that of the first embodiment and the explanation of this will be omitted.

Figure 7:
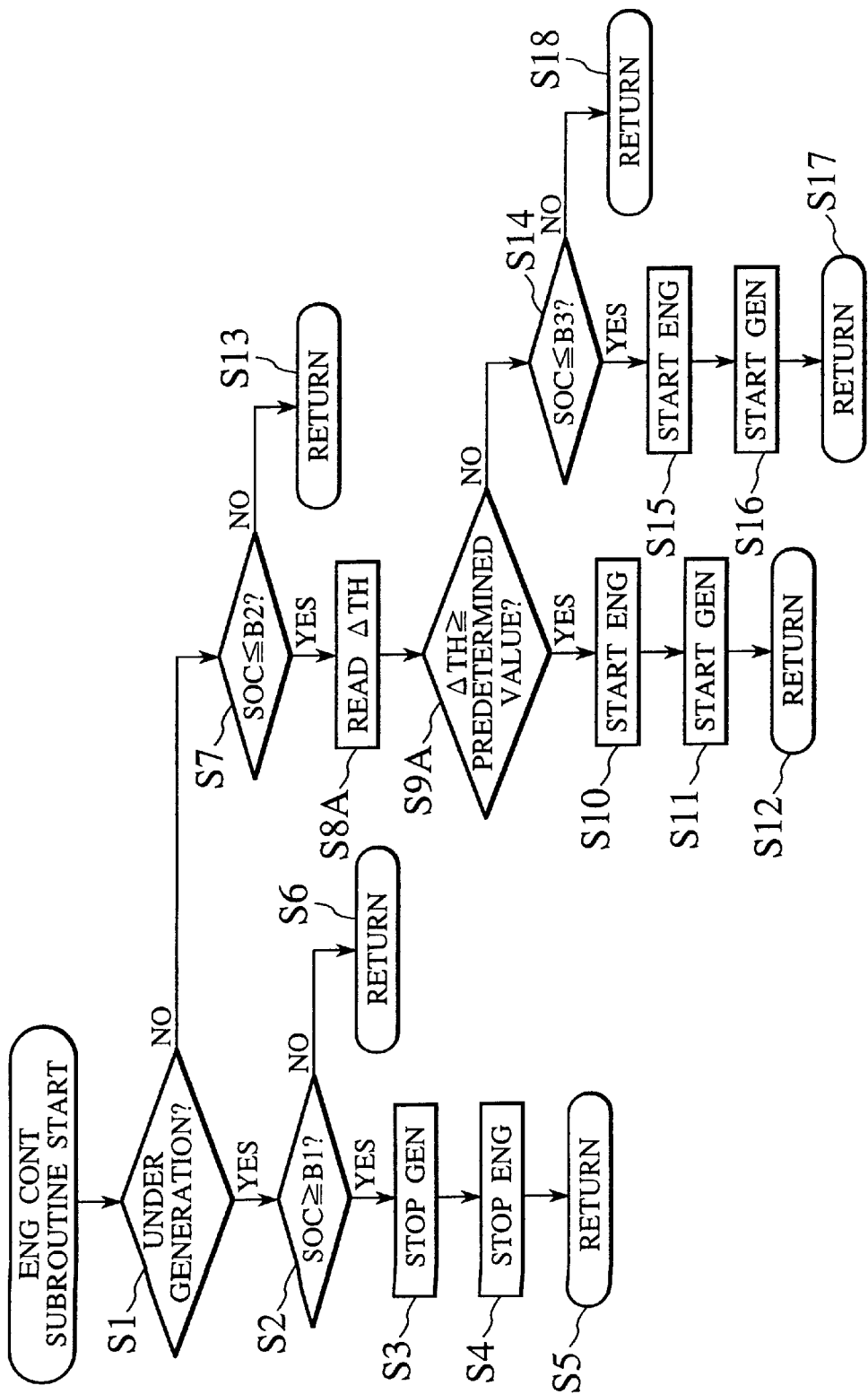
FIG. 7 is a diagram for showing a flowchart of the control by a controller according to a second embodiment of the present invention.

The present embodiment is different from the first embodiment in that S8 and S9 in the flowchart of the power generation control (engine control) in the first embodiment as shown in FIG. 6 are changed to S8A and S9A in the flowchart as shown in FIG. 7. Explanation will be made below with a focus on the differences in the contents of the processing.

When the processing reaches S8A, the EV ECU 8 reads an accelerator stroke speed (accelerator pedal treading speed) ΔTH at S8A.

Then, at S9A, the EV ECU 8 makes a decision as to whether or not this ΔTH is at or above a predetermined value. If this is at or above the predetermined value, the process goes to S10, and if this is less than the predetermined value, the process goes to S14. In this case, the predetermined value is assumed to be an accelerator stroke change volume of 1/2 per second, provided that its full stroke volume is 1/1, as an example.

The contents of the processing of S10 and S14 and afterwards are the same as those of the first embodiment.

In other words, while in the first embodiment, a decision is made as to whether or not the condition for starting the power generation is met based on an absolute value of the accelerator stroke volume (accelerator pedal treading volume) TH, in the present embodiment, a decision is made as to whether or not the condition for starting the power generation is met based on the accelerator stroke speed (accelerator pedal treading speed) ΔTH.

According to the above described structure of the present embodiment, a decision is made as to whether or not the condition for starting the power generation is met based on the accelerator stroke speed (accelerator pedal treading speed) ΔTH, and it becomes possible to secure more accurately the timing of the generation of the torque variation of the driving motor 1. For example, the engine 5 can be started at the peak time of the torque variation.

Accordingly, in addition to the operation and effect of the first embodiment, it is also possible to obtain an effect that the engine 5 can be started when the engine mounting system is highly loaded with large vibration and noise of the electric vehicle. The vibration and noise generated by the starting of the engine 5 in this case can be made to be sensed not so significantly.

Next, a third embodiment of the present invention will be explained in detail with reference to the drawings.

The system configuration of the present embodiment is also similar to that of the first embodiment and the explanation of this will be omitted.

Figure 8:
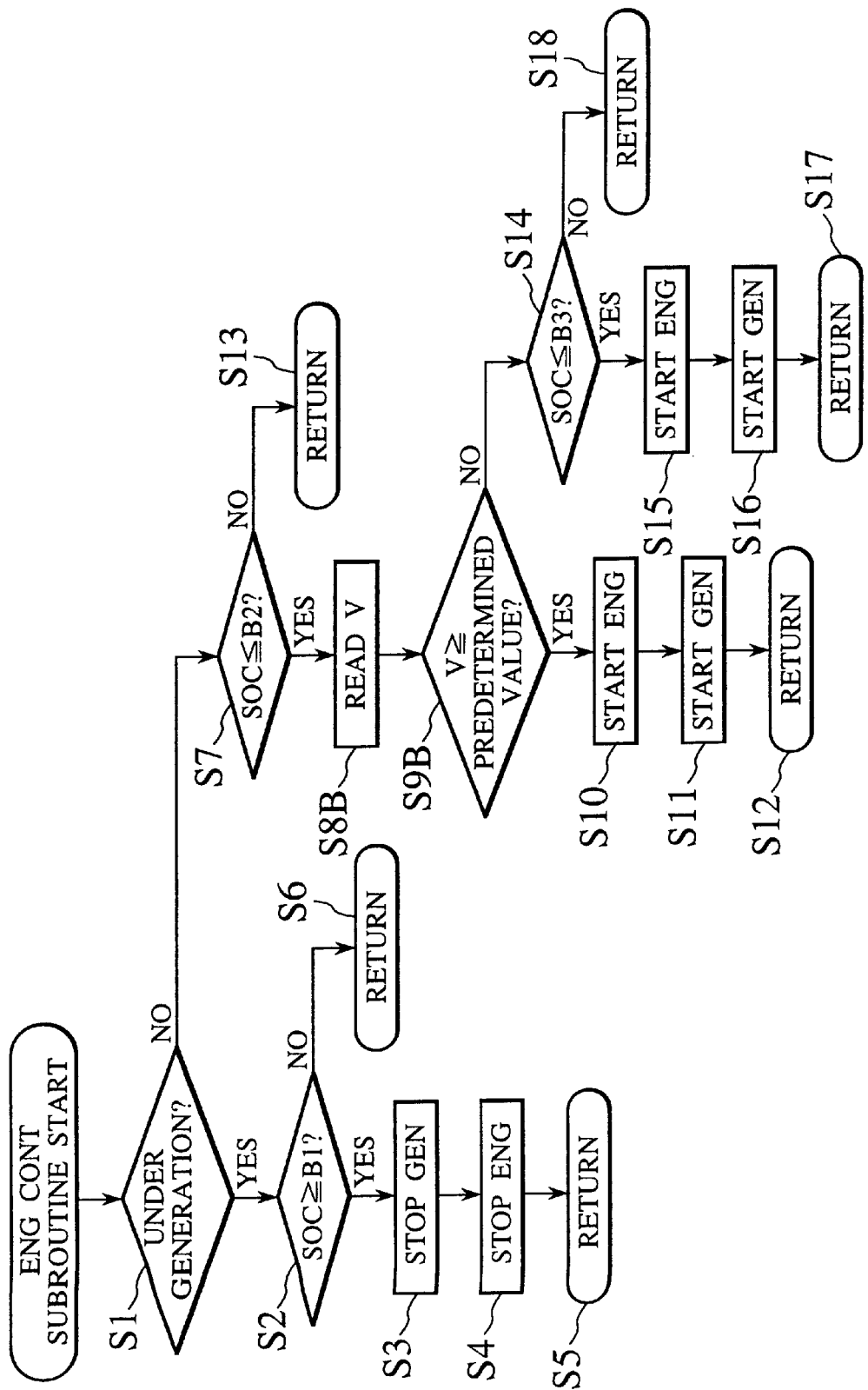
FIG. 8 is a diagram for showing a flowchart of the control by a controller according to a third embodiment of the present invention.

The present embodiment is different from the first embodiment in that S8 and S9 in the flowchart of the power generation control (engine control) in the first embodiment as shown in FIG. 6 are changed to S8B and S9B in the flowchart as shown in FIG. 8. Explanation will be made below with a focus on the differences in the contents of the processing.

When the processing reaches S8B, the EV ECU 8 reads a vehicle velocity V from the vehicle velocity sensor 2a.

Then, at S9B, the EV ECU 8 makes a decision as to whether or not this V is at or above a predetermined value (for example, 80 km/h). If this is at or above the predetermined value, the process goes to S10, and if this is less than the predetermined value, the process goes to S14.

The contents of the processing of S10 and S14 and afterwards are the same as those of the first embodiment.

In other words, while in the first embodiment, a decision is made as to whether or not the condition for starting the power generation is met based on an absolute value of the accelerator stroke volume (accelerator pedal treading volume) TH, in the present embodiment, a decision is made as to whether or not the condition for the starting of the power generation is met based on the vehicle velocity V. The vehicle velocity V is taken up for the reason that if the vehicle is driving at a higher velocity, the vibration and noise of the driving motor 1 itself or the vibration and noise of road noise and its wind breaking are being generated at a higher level.

According to the above described structure of the present embodiment, the power generation is started when the vehicle velocity V is at or above a predetermined value, and when the vibration and noise of the driving motor 1 itself or the electric vehicle itself are being generated at a higher level, the engine 5 can be started.

Accordingly, in addition to the operation and effect of the first embodiment, it is also possible to obtain an effect that the engine 5 can be started when the vibration and noise of the driving motor 1 itself or the electric vehicle itself are large. The vibration and noise generated by the starting of the engine 5 in this case can be made to be sensed not so significantly.

Next, a fourth embodiment of the present invention will be explained in detail with reference to the drawings.

The system configuration of the present embodiment is also similar to that of the first embodiment and the explanation of this will be omitted.

Figure 9:
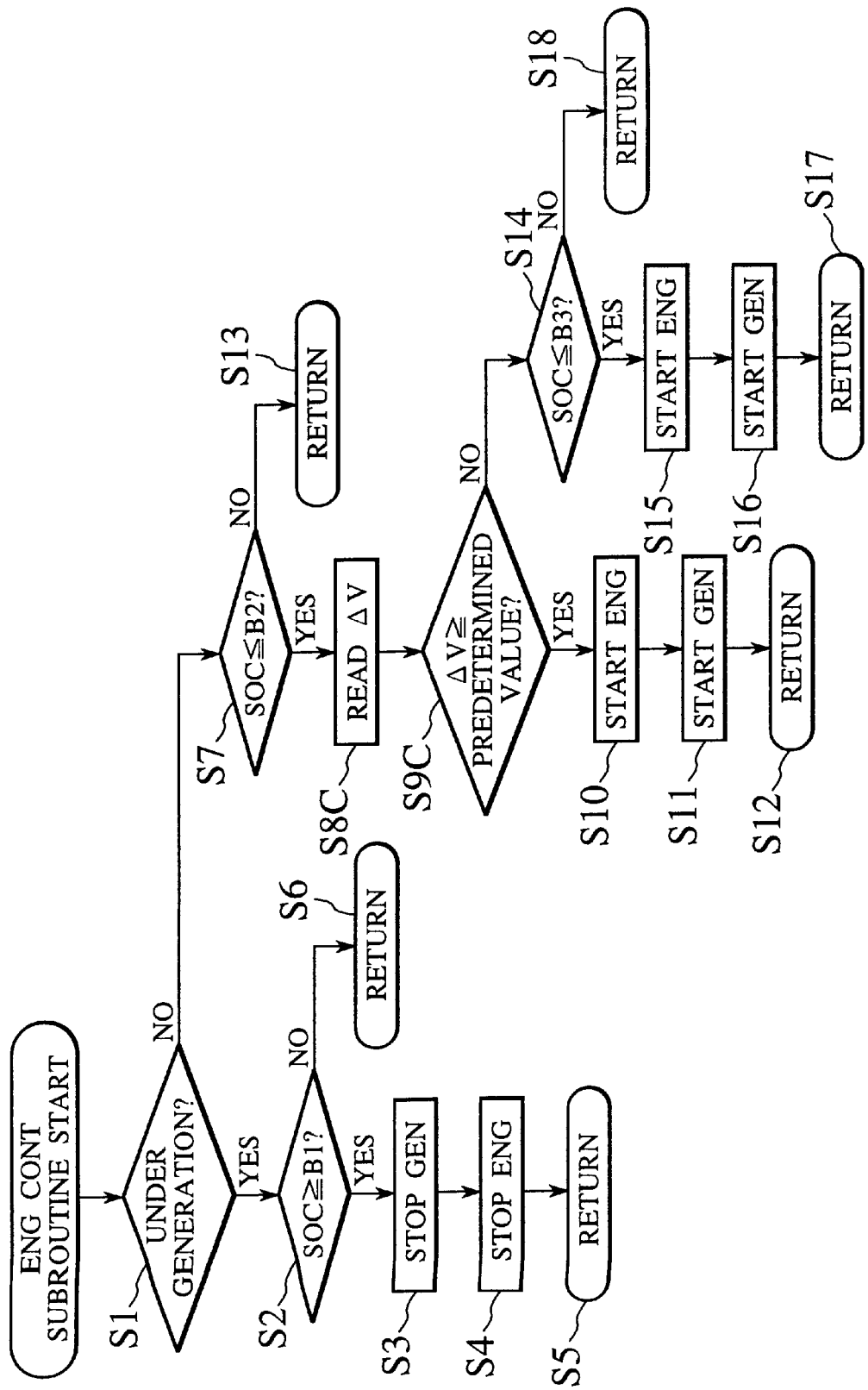
FIG. 9 is a diagram for showing a flowchart of the control by a controller according to a fourth embodiment of the present invention.

The present embodiment is different from the first embodiment in that S8 and S9 in the flowchart of the power generation control (engine control) in the first embodiment as shown in FIG. 6 are changed to S8C and S9C in the flowchart as shown in FIG. 9. Explanation will be made below with a focus on the differences in the contents of the processing.

When the processing reaches S8C, the EV ECU 8 calculates a vehicle acceleration (vehicle velocity change) ΔV by using the vehicle velocity V read from the vehicle velocity sensor 2a.

Then, at S9C, the EV ECU 8 makes a decision as to whether or not this ΔV is at or above a predetermined value. If this ΔV is at or above the predetermined value, the process goes to S10, and if this is less than the predetermined value, the process goes to S14. In this case, the predetermined value is assumed at 0.15 G (G represents an acceleration of gravity).

The contents of the processing of S10 and S14 and afterwards are the same as those of the first embodiment.

In other words, while in the first embodiment, a decision is made as to whether or not the condition for starting the power generation is met based on an absolute value of the accelerator stroke volume(accelerator pedal treading volume) TH, in the present embodiment, a decision is made as to whether or not the condition for the starting of the power generation is met based on the vehicle acceleration (vehicle velocity change) ΔV. Such a vehicle acceleration (vehicle velocity change) ΔV is taken up for the reason that, if the vehicle is driving at a higher acceleration, the vibration and noise of the driving motor 1 itself or the vibration and noise of road noise and its wind breaking are being generated at a higher level and that the acceleration itself is done by the driver's intention.

According to the above described structure of the present embodiment, the power generation is started when the vehicle acceleration (vehicle velocity change) ΔV is at or above the predetermined value, and the engine 5 can be started when the vibration and noise of the driving motor 1 itself or the electric vehicle itself are being generated at a higher level. Further, the driver himself or herself can start the engine 5 when the driver is conscious of the acceleration.

Accordingly, in addition to the operation and effect of the first embodiment, it is also possible to obtain an effect that the engine 5 can be started when the vibration and noise of the driving motor 1 itself or the electric vehicle are large. The vibration and noise generated by the starting of the engine 5 in this case can be made to be sensed not so significantly. Further, as the engine 5 is started in the state that the driver himself or herself is conscious of the acceleration, the driver does not feel the generated vibration and noise unnatural, and feels no discomfort.

Last, a fifth embodiment of the present invention will be explained in detail with reference to the drawings.

The system configuration of the present embodiment is also similar to that of the first embodiment and the explanation of this will be omitted.

Figure 10:
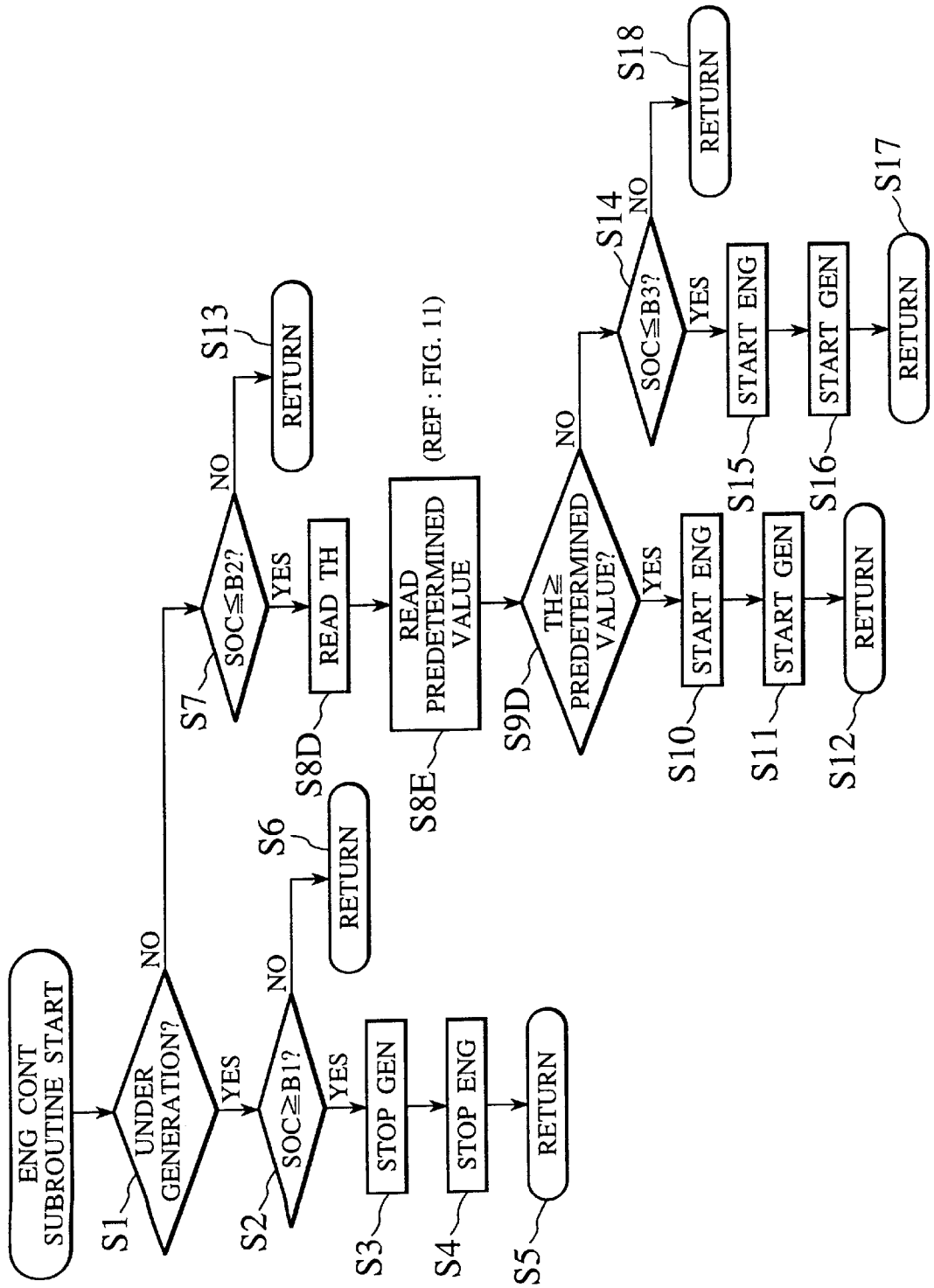
FIG. 10 is a diagram for showing a flowchart of the control by a controller according to a fifth embodiment of the present invention.

The present embodiment is different from the first embodiment in that S8 and S9 in the flowchart of the power generation control (engine control) in the first embodiment as shown in FIG. 6 are changed to S8D, S8E and S9C in the flowchart as shown in FIG. 10. Explanation will be made below with a focus on the differences in the contents of the processing.

When the processing reaches S8D, the EV ECU 8 reads an accelerator stroke volume (accelerator pedal treading volume) TH at S8D.

Figure 11:
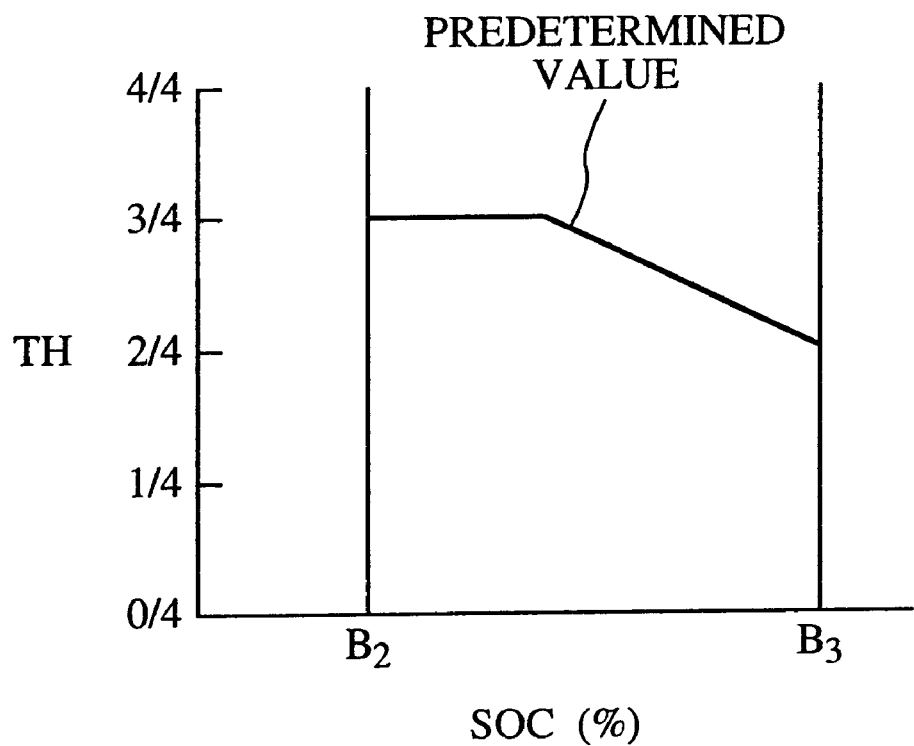
FIG. 11 is a diagram for showing a map of a predetermined value which becomes a starting condition for starting (cranking) a power generator-driving engine and is used in the controller.

Next, at S8E, the EV ECU 8 refers to a map (table) for showing a relationship between the accelerator stroke volume (accelerator pedal treading volume) TH and the SOC of the battery 10 as shown in FIG. 11 and reads a predetermined value of the TH corresponding to the current SOC. In this case, in FIG. 11, the predetermined value of the TH is set at a constant value in the area where the SOC of the battery 10 is near B2, and the predetermined value of the TH decreases in inverse proportion when the SOC becomes a smaller value by further approaching B3 from B2.

At S9D, the EV ECU 8 makes a decision as to whether the TH is at or above the predetermined value. If the TH is at or above the predetermined value, the process goes to S10, and if the TH is less than the predetermined value, the process goes to S14.

The contents of the processing of S10 and S14 and afterwards are the same as those of the first embodiment.

In other words, while in the first embodiment, a decision is made as to whether or not the condition for starting the power generation is met based on the relationship between the accelerator stroke volume (accelerator pedal treading volume) TH and a predetermined value of a constant value, in the present embodiment, a decision is made as to whether or not the condition for the starting of the power generation is met based on the relationship between the accelerator stroke volume (accelerator pedal treading volume) TH and the predetermined value of the TH having the profile can be given in voluntary corresponding to the SOC of the battery 10.

The reason why such a voluntarily predetermined value is used is that the opportunity for power generation can be increased when the SOC approaches B3 of a higher demand for charging. More specifically, immediately after the SOC of the battery 10 has become B2 or below, there is relatively some margin regarding the SOC. Thus, the opportunity for power generation is decreased until when the vibration and noise generated by the starting of the engine 5 become not sensed easily by the crew so as to avoid generating discomfort. In other words, the predetermined value of the TH is set at a relatively high constant value immediately after the SOC of the battery 10 has become B2 or below, and the predetermined value is gradually decreased after the SOC of the battery 10 approaches B3 to increase the opportunity for power generation by gradually relaxing the condition for starting the power generation. Thus, the predetermined value is set so as not to generate inconvenience to the driving of the vehicle due to the shortage of the SOC.

According to the above described structure of the present embodiment, when there is relatively some margin in the SOC of the battery 10, the opportunity for power generation is decreased and the starting of the engine 5 is restrained. And the engine 5 is started under a situation that the vibration and noise generated by the starting of the engine 5 are not sensed easily. When there is no margin in the SOC, the opportunity for power generation is increased to perform charging and thus ensures a secure driving of the electric vehicle.

Accordingly, in addition to the operation and effect of the first embodiment of the present invention, it is possible to obtain an effect that when there is relatively some margin in the SOC of the battery 10, electric power can be generated in only the situation where the vibration and noise of the engine 5 are not conspicuous. Thus, the vibration and noise generated by the engine 5 are not made more conspicuous. Further, when there is no margin in the SOC and it becomes necessary to charge urgently, power can be generated frequently, so as to securely avoid a situation where the electric vehicle cannot be driven because of the capacity shortage of the battery 10.

In other words, according to the present embodiment, it is possible to eliminate a discomfort sensed by the crew due to the vibration and noise by the starting of the engine 5, and to secure the stable driving of the electric vehicle.

In the present embodiment, the condition for the starting of power generation has been set such that the predetermined value of the accelerator stroke volume (accelerator pedal treading volume) TH is voluntarily given corresponding to the SOC of the battery 10. However, it is needless to mention that the condition for the starting of power generation may also be set such that any one of the predetermined values of the accelerator stroke speed (accelerator pedal treading speed) ΔTH, the vehicle velocity V and the vehicle acceleration ΔV used in the embodiments 2 through 5 is given corresponding to the SOC of the battery 10 in a similar manner.

It is also possible to set the condition for starting the power generation by suitably combining the accelerator stroke volume (accelerator pedal treading volume) TH, the accelerator stroke speed (accelerator pedal treading speed) ΔTH, the vehicle velocity V and the vehicle acceleration ΔV explained in the above described embodiments of the present invention.

Further, although the SHEV is taken as an example of the EV in the above described embodiments of the present invention, the present invention can also be applied in principle to a parallel hybrid electric vehicle (PHEV) in which an engine can directly become a driving source depending on the situation.

Further, although description has been made by taking an electric vehicle as an example in the above described embodiments of the present invention, the present invention can also be applied in principle to other kinds of vehicle bodies using electric energy for a driving power, such as, for example, an electric bicycle.

What is claimed is:

1. An electric vehicle, comprising:
    an electric motor driving said electric vehicle;
    a battery storing electric power to be supplied to said electric motor;
    a generator to generate electric power so as to supply said electric power generated by said generator to said electric motor and/or said battery;
    an engine making said generator generate said electric power;
    a first sensor detecting a state of charge (SOC) of said battery;
    a second sensor detecting an operative condition of said electric vehicle; and
    a controller enabling said generator to generate said electric power by starting said engine when said SOC detected by said first sensor is equal to or less than a first value, and enabling said generator to generate said electric power by starting said engine when said SOC detected by said first sensor is equal to or less than a second value larger than said first value and said operative condition of said electric vehicle is detected by said second sensor, while not starting said engine to enable said generator to generate said electric power when said SOC detected by said first sensor is equal to or less than said second value but said operative condition of said electric vehicle is not detected by said second sensor,
    wherein there is a region in which said controller does not start said engine to enable said generator to generate said electric power when said SOC detected by said first sensor is more than said first value and equal to or less than said second value after said controller does not start said engine to enable said generator to generate said electric power when said SOC detected by said first sensor is equal to or more than said second value but said operative condition of said electric vehicle is not detected by said second sensor.

2. An electric vehicle according to claim 1, wherein said operative condition of said electric vehicle includes said accelerator stroke length of said electric vehicle being at or above a predetermined value.

3. An electric vehicle according to claim 1, wherein said operative condition of said electric vehicle includes said accelerator stroke speed of said electric vehicle being at or above a predetermined value.

4. An electric vehicle according to claim 1, wherein said operative condition of said electric vehicle includes velocity of said electric vehicle being at or above a predetermined value.

5. An electric vehicle according to claim 1, wherein said operative condition of said electric vehicle includes an acceleration of said electric vehicle being at or above a predetermined value.

6. An electric vehicle according to claim 1, wherein said operative condition of said electric vehicle includes a high load being applied to said electric vehicle.

7. An electric vehicle according to claim 1, wherein said second value is located within a range of above a normal power generation starting SOC and below a normal power generation completion SOC by a predetermined value.

8. An electric vehicle according to claim 1, wherein said electric vehicle is a series hybrid electric vehicle.

9. A controller for an electric vehicle, said electric vehicle being provided with an electric motor driving said electric vehicle, a battery storing electric power, a generator generating electric power so as to supply said electric power generated by said generator to said electric motor and/or said battery, and an engine capable of making said generator generate said electric power, comprising:
    a power generation control means for enabling said generator to generate said electric power by starting said engine when a state of charge (SOC) of said battery is equal to or less than a first value, and enabling said generator to generate said electric power by starting said engine when said SOC is equal to or less than a second value larger than said first value and an operative condition of said electric vehicle is satisfied, while not starting said engine to enable said generator to generate said electric power when said SOC is equal to or less than said second value but said operative condition of said electric vehicle is not satisfied,
    wherein there is a region in which said power generation control means does not start said engine to enable said generator to generate said electric power when said SOC is more than said first value and equal to or less than said second value after said power generation control means does not start said engine to enable said generator to generate said electric power when said SOC is equal to or more than said second value but said operative condition of said electric vehicle is not satisfied.

10. An electric vehicle according to claim 1, wherein said first value is equal to 80% of SOC and wherein said second value is equal to 40% of SOC.

11. A controller for an electric vehicle according to claim 9, wherein said first value is equal to 80% of SOC and wherein said second value is equal to 40% of SOC.

12. A controller for an electric vehicle according to claim 9, wherein said first value is equal to 80% of SOC and wherein said second value is equal to 40% of SOC.

13. A controller for an electric vehicle, said electric vehicle being provided with an electric motor driving said electric vehicle, a battery storing electric power, a generator generating electric power so as to supply said electric power generated by said generator to said electric motor and/or said battery, and an engine capable of making said generator generate said electric power, comprising:
    a power generation control unit enabling said generator to generate said electric power by starting said engine when a state of charge (SOC) of said battery is equal to or less than a first value, and enabling said generator to generate said electric power by starting said engine when said SOC is equal to or less than a second value larger than said first value and an operative condition of said electric vehicle is satisfied, while not starting said engine to enable said generator to generate said electric power when said SOC is equal to or less than said second value but said operative condition of said electric vehicle is not satisfied, wherein there is a region in which said power generation control unit does not start said engine to enable said generator to generate said electric power when said SOC is more than said first value and equal to or less than said second value after said power generation control unit does not start said engine to enable said generator to generate said electric power when said SOC is equal to or more than said second value but said operative condition of said electric vehicle is not satisfied.

14. A controller according to claim 13, wherein said operative condition is detected in correspondence with velocity of said electric vehicle and determination is performed whether said velocity is equal to or more than a predetermined value or not.

15. A controller according to claim 13, wherein said operative condition is detected in correspondence with acceleration of said electric vehicle and determination is performed whether said acceleration is equal to or more than a predetermined value or not.

16. A controller according to claim 13, wherein said operative condition is detected in correspondence with a state where said electric vehicle is going up a hill and determination is performed whether said vehicle is going up said hill or not.

17. A controller according to claim 15, wherein said operative condition is detected in correspondence with an accelerator stroke length of said electric vehicle.

18. A controller according to claim 16, wherein said operative condition is detected in correspondence with an accelerator stroke length of said electric vehicle.

19. A controller according to claim 15, wherein said operative condition is detected in correspondence with an accelerator stroke speed of said electric vehicle.

20. A controller according to claim 16, wherein said operative condition is detected in correspondence with an accelerator stroke speed of said electric vehicle.

21. A controller according to claim 15, wherein said operative condition is detected in correspondence with velocity change of said electric vehicle.

22. A controller according to claim 16, wherein said operative condition is detected in correspondence with velocity change of said electric vehicle.

23. A controller according to claim 14, wherein said power generation control unit prohibits a start of said engine, even if said operative condition is satisfied, when said SOC of said battery is more than said second value.

24. A controller according to claim 15, wherein said power generation control unit prohibits a start of said engine, even if said operative condition is satisfied, when said SOC of said battery is more than said second value.

25. A controller according to claim 16, wherein said power generation control unit prohibits a start of said engine, even if said operative condition is satisfied, when said SOC of said battery is more than said second value.

26. A controller according claim 17, wherein said power generation control unit prohibits a start of said engine, even if said operative condition is satisfied, when said SOC of said battery is more than said second value.

27. A controller according to claim 18, wherein said power generation control unit prohibits a start of said engine, even if said operative condition is satisfied, when said SOC of said battery is more than said second value.

28. A controller according to claim 19, wherein said power generation control unit prohibits a start of said engine, even if said operative condition is satisfied, when said SOC of said battery is more than said second value.

* * * * *